United States Patent [19]

Wolf

[11] 3,999,326
[45] Dec. 28, 1976

[54] SNAG-HOOK FOR SALMON FISHING

[76] Inventor: Robert P. Wolf, 4439 N. Drake Ave., Chicago, Ill. 60625

[22] Filed: Aug. 6, 1975

[21] Appl. No.: 602,234

[52] U.S. Cl. .............................. 43/42.7; 43/43.14; 43/44.81; 43/44.82
[51] Int. Cl.² ...................................... A01K 83/00
[58] Field of Search ............ 43/44.81, 44.82, 42.7, 43/42.38, 43.14, 42.09, 44.8, 17.2, 44.96, 44.97, 43.1

[56] References Cited

UNITED STATES PATENTS

| 2,770,909 | 11/1956 | Illgner | 43/43.14 |
| 3,178,846 | 4/1965 | Hansen | 43/17.2 |
| 3,181,265 | 5/1965 | Cook | 43/44.81 |
| 3,604,141 | 9/1971 | Spencer | 43/44.81 |

Primary Examiner—Warner H. Camp
Attorney, Agent, or Firm—Hill, Gross, Simpson, Van Santen, Steadman, Chiara & Simpson

[57] ABSTRACT

A snag-hook particularly adapted for salmon fishing having barbed tines having a central stem terminating into an eye for the attachment of a fish line thereto. A weight is provided with slots and a central recessed portion to receive the stem and tines of the hook. The weight extends in an opposite direction from the eye of the hook. A retainer member in the form of a resilient ring having overlapping ends detachably mounts the hook to the weight and accommodates the interchangeability of weights of different sizes and different hooks for different snag-fishing conditions.

6 Claims, 5 Drawing Figures

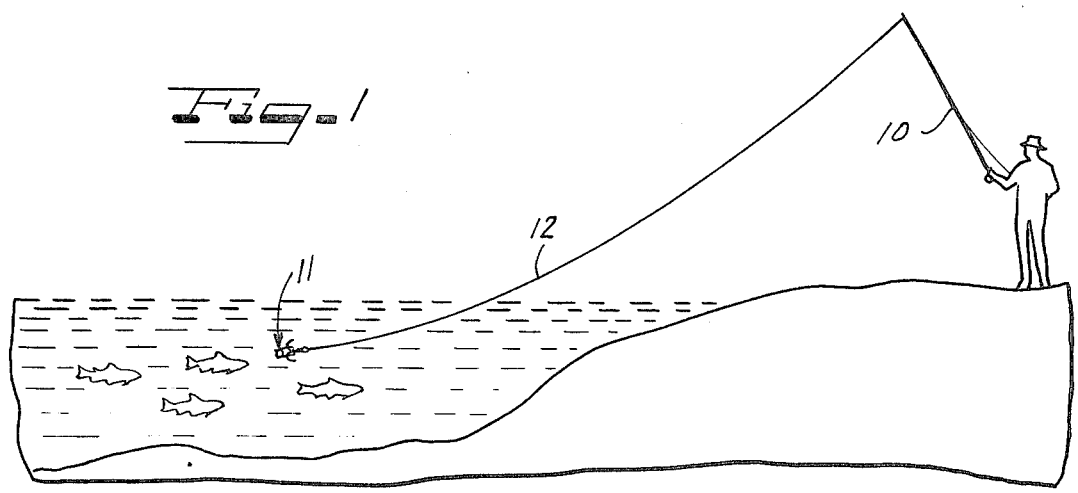
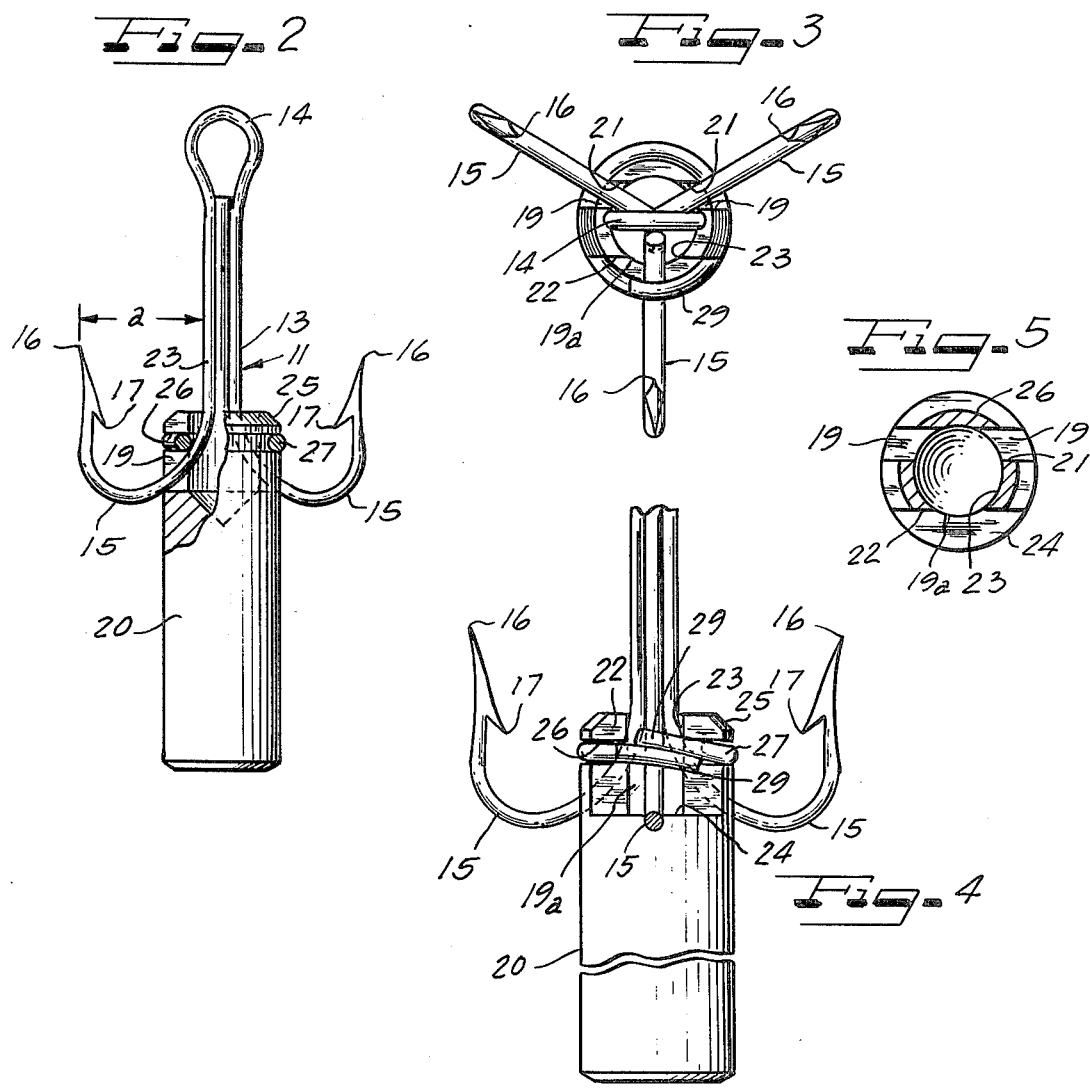

SNAG-HOOK FOR SALMON FISHING

FIELD OF THE INVENTION AND PRIOR ART

Snag-hooks for snagging salmon and like fish when swimming to spawning grounds have previously been used and have been provided with a weight which in many instances is molded directly onto the snag-hook or else is in the form of a piece of lead or heavy metal tied directly onto the hook with wire or other suitable fastening means.

BACKGROUND OF THE INVENTION

Fishing for salmon and other spawning fish by snagging the salmon with a weighted hook as they swim to their spawning grounds has become quite common, particularly in the Great Lakes region where salmon are seasonally planted in the lakes. The salmon die after spawning and usually come to their spawning grounds in great numbers, so may readily be snagged with a barbed hook. The hook, however, must conform to state regulations. As for example, in Wisconsin, the exposure from the tip of the hook to the stem or shank cannot be more than ½ inch. In Illinois, the spacing from the tip of the hook to the stem or shank must be ½ inch or more. It has thus become desirable to have interchangeable hooks and weights providing the required spacing between the tip of the hook and stem of the hook, which will conform to the laws of the state in which the fishing is carried out. It is, of course, understood that in snag-fishing, the hook is cast into the water to snag a salmon or other fish swimming to the spawning grounds, which may be up-stream from a lake or other body of water, and the hook, therefore, usually has more than one barbed tine to assure the snagging of the fish when hit by the weight and hook or when the hook may be drawn along the fish and make contact therewith.

The present invention improves upon the prior art snag-hooks in that the hook may be interchangeably mounted on weights of different lengths and weights and may be removed from its weight without damage either to the hook or weight.

Other advantages of the invention are that a multi-tined hook may be weighted in a simple manner and may be interchanged to conform to state laws while the weights may also be interchangeable in accordance with the preferences of the individual fisherman and the type and size of fish being snagged.

A further advantage of the invention is that the bight portions of the tines of the hook leading to the stem may be recessed in a metal weight and detachably locked thereto, with the weight extending in a direction opposite from the tines of the hook.

A still further advantage of the invention is that a multi-tined hook may be received and retained to a weight having recessed portions opening to the end of the weight facing the eye of the hook, and the recessed portions may be in the form of individual slots for each tine of the hook by a single axial drilling operation of the weight and a single transverse milling operation intersecting the drilled portion of the weight and forming three slots receiving a three-tined hook with the tines spaced approximately 120° apart.

A still further advantage of the invention is that the hook may be recessed in the weight and detachably held thereto by a ring-like retaining means.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a schematic view illustrating the snagging of fish swimming to their spawning grounds by a snag-hook constructed in accordance with the principles of the present invention;

FIG. 2 is a view in side elevation of a snag-hook embodying the principles of the invention, with certain parts broken away and certain other parts shown in transverse section;

FIG. 3 is an end view of the snag-hook and weight shown in FIG. 2 looking at the hook and weight toward the barbed tines of the hook;

FIG. 4 is a fragmentary side elevational view of the hook and weight with one of the tines shown in section in order to illustrate one of the slots formed by the milling operation, intersecting the axial drilled portion of the weight; and FIG. 5 is an end view of the weight with the hook removed and portions shown in horizontal section.

DESCRIPTION OF PREFERRED EMBODIMENT OF INVENTION

In FIG. 1 of the drawings, I have shown a fisherman standing along the bank of a river or other body of water holding a casting rod 10 and casting a snag-hook 11 on the end of a line 12 in an effort to snag a fish, such as salmon, and land the fish.

The snag-hook 11 is shown as being a three-tined hook, although it need not necessarily be a three-tined hook, but for snag-fishing, a hook having a plurality of tines, such as two, three or even six tines is most satisfactory in order to snag and land a desired fish.

In FIGS. 1, 2 and 3, I have shown a three-tined hook having tines 15 which extend from a central stem 13 having an eye 14 on the end thereof, adapted to be attached to the fishing line 12 in a conventional manner. Two tines may be formed integrally with the eye and stem while the third tine may be welded to the stem to provide three barbed tines 15 having sharp, pointed ends 16 and barbs 17 facing in a direction opposite to the pointed ends thereof to snag a fish when drawn along the side, bottom or back of the fish. The tines extend along axial slots 19 and 19a, spaced in accordance with the spacing of the tines which usually is 120° apart, of a weight 20 which may be cylindrical in form, as shown in the drawings, but which need not necessarily be cylindrical but may be of other desired forms. The slots 19, as shown in FIGS. 3 and 5, may be formed by a milling operation utilizing a double milling cutter (not shown) cutting parallel milled portions 21 and 22 in the end of the weight 20 and intersecting a central axially drilled portion 23 receiving the stem 13 and the bight portions of the tines, extending directly from said shank.

In FIG. 2, I have shown a distance a between the tips of the hook and the stem 13. The distance a may be ½ inch or less in Wisconsin and may be more than ½ inch in Illinois.

It may be seen from FIGS. 3, 4 and 5 that the milled portion 22 mills off one side of the weight and intersects the drilled portion 23 to provide a bottom shouldered portion 24 and a flat side portion extending perpendicular thereto and forming a relatively wide slot 19a cooperating with the slots 19 formed by the milled portion 21 to enable the bight portions of the tines of the barbed hook 11 to be placed in the drilled portion 23 from the open end thereof and provide slots for the three tines of the hook extending radially of the shank thereof, 120° apart.

The weight 20 also has a beveled end 25 with a groove 26 disposed just beneath said beveled end and extending thereabout to the flattened portion of the weight formed by the milled cut 22. The groove 26 may receive a retainer member 27 which may be in the form of a resilient ring-like member made from resilient metal and having overlapping ends 29 resiliently engaging each other to positively hold the ring to the groove 26 (FIG. 4). The ring, of course, may be made from a non-degradable plastic material and in some cases, may be a continuous resilient ring with sufficient elasticity to enable the ring to be placed into the groove 26 and be retained thereto.

The differences in distances between the stem or shank of the hook and the tips of the barbed ends may be attained by the substitution of hooks of varying sizes.

It may be seen from the foregoing that a simplified weighting means has been provided for a snag-hook avoiding the use of lead weights and the contamination which may be caused by accidental loss of the weights and provides an interchangeable weighting system for snag-hooks, enabling the weight to be preselected by the fisherman in accordance with snag-fishing conditions and the preferences of the fisherman.

I claim as my invention:

1. For use with a snag-hook having a stem having an eye at one end adapted to be attached to a fishing line and having a plurality of reversely turned barbed tines with bight portions leading from the stem to the barbed tines, the improvement comprising:
    a two-piece sinking weight having slots at one end to receive the tines of the hook and having a central recessed portion for the bight portions of the tines,
    a groove extending about the weight and intersecting the slots and retainer means detachably recessed in said groove and retaining the hook to the weight,
    the central recessed portion of the weight being formed by a central drilled portion,
    and two parallel milled portions intersecting the central drilled portion, and extending transversely of the weight,
    one milled portion forming two slots to receive two tines of the hook and the other milled portion opening to the periphery of the weight and cooperating with the central drilled portion to form a third slot receiving the third tine of the hook,
    the weight having a groove extending partially thereabout and intersecting at least two of said slots, and said detachable yieldable retainer member being removably mounted in said groove and having overlapping ends extending along the milled portion opening to the periphery of the weight to retain said hook to said weight.

2. For use with the snag-hook as described in claim 1, wherein the yieldable retainer member is ring-like in form with said overlapping ends and is made from a yieldable nondegradable material.

3. For use with the snag-hook as described in claim 1, wherein the slots are of sufficient width to accommodate the interchangeability of hooks of different sizes.

4. For use with the snag-hook as described in claim 1, wherein the yieldable retainer member is removable to accommodate the replacement of hooks and weights of such size and weight as are adapted for different snag-hooking conditions, and wherein the yieldable retainer member is ring-like in form having said overlapping ends and is made from a yieldable metal.

5. For use with a snag-hook having an eye, a stem extending longitudinally from said eye and terminating in a plurality of reversely turned tines having hook portions spaced radially outwardly from said shank, the improvement of
    a two-piece sinking weight comprising,
    a first piece and a second piece having intermating locking parts engageable with one another to lock the sinking weight in assembly with the snag-hook,
    one of said pieces constituting one of a plurality of modularized, selectively replaceable, generally cylindrical weighted body members each sized in graduated weights of different graded denominations,
    one of said pieces being of lesser diameter than the hook portions and adapted to have said eye and said stem inserted therethrough,
    one said piece having formed therein a plurality of circumferentially spaced slots in one end thereof corresponding in number to the tines of the snag-hook for receiving and seating the corresponding plurality of tines of the snag-hook, and further including a circumferentially extending groove spaced inwardly of the outer ends of said tines, but outwardly toward said stem, and the other piece constituting a ring through which said eye and said shank are passed with said ring being received in said circumferential groove for locking the two pieces in assembled relationship on the snag-hook.

6. For use with the snag-hook as described in claim 5, wherein the said body member has a central recessed portion formed by a central drilled portion, and two parallel milled portions intersecting the central drilled portion, and extending transversely of the body member, one milled portion forming two slots to receive two tines of the hook and the other milled portion opening to the periphery of the body member and cooperating with the central drilled portion to form a third slot receiving a third tine of the hook.

* * * * *